June 16, 1964     G. A. OWL, JR., ETAL     3,137,460
IMPROVING SUPERSONIC LIFT-TO-DRAG RATIO
BY COMPRESSION SHOCK Filed Nov. 1, 1957                             4 Sheets-Sheet 1

INVENTORS
GEORGE A. OWL, JR.
ARTHUR C. LEY
DONALD J. BECK
BY
Charles F. Dischler
ATTORNEY INVENTORS
GEORGE A. OWL JR.
ARTHUR C. LEY
DONALD J. BECK
BY
*Charles F. Dischler*
ATTORNEY

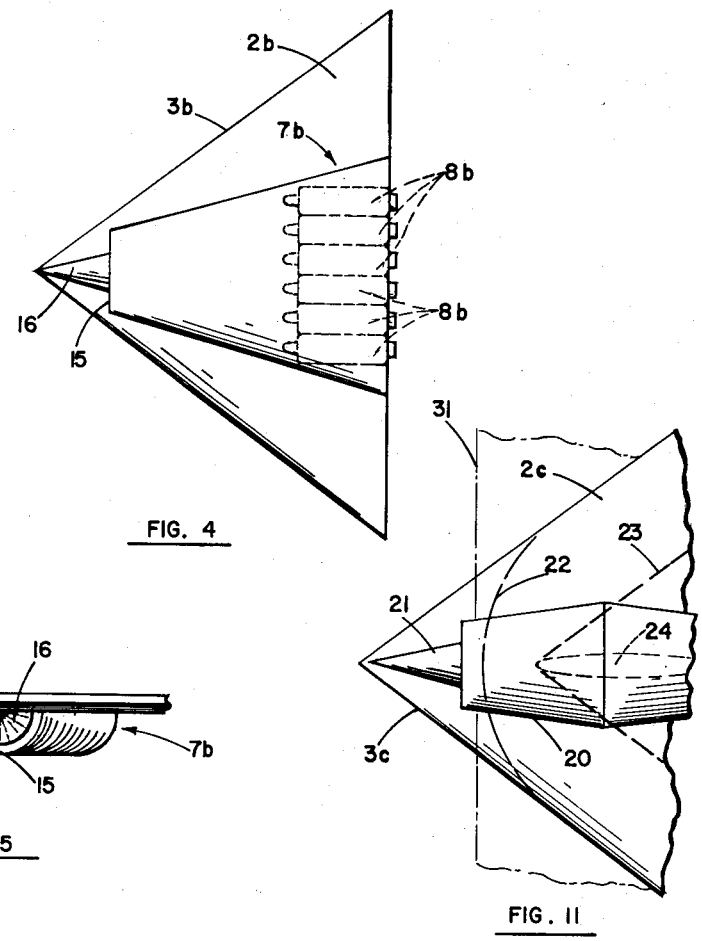

June 16, 1964  G. A. OWL, JR., ETAL  3,137,460
IMPROVING SUPERSONIC LIFT-TO-DRAG RATIO
BY COMPRESSION SHOCK Filed Nov. 1, 1957  4 Sheets-Sheet 4

INVENTORS
GEORGE A. OWL, JR.
ARTHUR C. LEY
DONALD J. BECK

BY Charles F. Dischler

ATTORNEY

United States Patent Office 3,137,460
Patented June 16, 1964

3,137,460
IMPROVING SUPERSONIC LIFT-TO-DRAG
RATIO BY COMPRESSION SHOCK
George A. Owl, Jr., Gardena, Arthur C. Ley, Torrance, and Donald J. Beck, Downey, Calif., assignors to North American Aviation, Inc.
Filed Nov. 1, 1957, Ser. No. 693,918
3 Claims. (Cl. 244—53)

This invention relates to aircraft and in particular it relates to an arrangement for improving the aerodynamic efficiency of an airborne vehicle by increasing the lifting force acting on the vehicle in a manner to achieve an increased lift-to-drag ratio and to attain the required lifting force at a reduced angle of attack.

One of the fundamental difficulties to be surmounted in the design of an airframe for efficient supersonic cruise is that of achieving lift-to-drag ratios (L/D) of a magnitude approaching subsonic capability. The lift-to-drag ratio is one of the parameters upon which the maximum range of an aircraft directly depends, with higher L/D ratios resulting in longer range. The essential problem is one of reducing total configuration drag since the lift term "L" in the lift-to-drag ratio is fixed by the weight of the aircraft system. The drag term "D" in the above ratio can be essentially divided into two parts: (a) the drag due to the airframe being submerged in and displacing an equivalent volume of air, and (b) the drag associated with the effective lifting force acting on the object due to its attitude, or angle of attack, in air. In the prior art the basic approach utilized to control the lift-to-drag ratio has been to decrease the drag due to submergence in the air by object shaping in order to minimize fluid disturbance. Some effort has also been applied toward control of the drag-due-to-lift term of part (b) by object shaping so as to alter the attitude (angle of attack) required of the object to produce a given quantity of total lift force and hence alter the drag associated with that total lift. However, the improvement to be obtained in the L/D parameter by object shaping is limited in extent.

The present invention contemplates a shock producing device of an appropriate shape located on an airborne vehicle and positioned to allow the shock pressure field produced thereby to create an upwardly acting pressure differential across the lifting surfaces of the vehicle. More specifically this invention is directed to engine air inlet geometry and its relation to the primary lifting surface of an airborne vehicle wherein the shock field produced for the initiation of engine inlet air pressure recovery is also utilized to create lifting force on such surface without detracting from the attainment of optimum engine thrust characteristics.

Accordingly, it is an object of this invention to provide an arrangement for obtaining the optimum aerodynamic efficiency of an airborne vehicle by increasing the lift-to-drag parameter for such a vehicle.

It is also an object of this invention to provide an aerodynamic arrangement for attaining the flight sustaining lift required for an airborne vehicle at a lower angle of attack than that which would be required without the use of this arrangement, whereby the drag due to the vehicle attitude is decreased.

It is another object of this invention to provide a means for producing a shock pressure field acting beneath the lifting surfaces of an aircraft or missile.

It is still another object of this invention to provide an engine air inlet structure utilizing a shock generating means for achieving the optimum pressure recovery of the inlet air, while at the same time producing a shock pressure field acting on the airfoil surfaces of the aircraft.

Yet another object of this invention is to provide an engine inlet structure utilizing a shock generating means for achieving the optimum pressure recovery of the inlet air while at the same time producing an upwardly directed pressure differential across the aircraft airfoil surfaces. The pressure differential across the airfoil may be achieved by creation of a pressure expansion field above the airfoil, or by a compression field beneath the airfoil, or by the combination of these two types of shock field mechanisms.

A further object of this invention is to provide an engine inlet structure utilizing a shock generating means for achieving the dual function of pressure recovery of the engine inlet air and also producing a shock pressure field acting beneath the airfoil surfaces of the aircraft, wherein said air inlet structure has multiple ramp means thereon for reinforcing the shock pressure field created by said engine inlet structure.

It is a still further object of this invention to provide an arrangement for increasing the speed and maximum range of an aircraft over that which is obtainable with conventional wing-fuselage combinations presently in use.

These and other objects and advantages of the present invention will become apparent to those skilled in the art after reading the present specification and the accompanying drawings forming a part thereof, in which:

FIG. 4 is a bottom plan view of a semiconical inlet embodiment of this invention beneath an airfoil surface;

FIG. 5 is a front elevational view of the semiconical inlet shown in FIG. 4;

FIG. 6 is a top plan view of an engine duct inlet positioned on the upper surface of the fuselage and airfoil and having an exterior configuration for producing expansion waves and thereby reducing the pressure field over the upper surface of the airfoil to produce an increased lift-pressure differential;

FIG. 7 is a side elevational view of the embodiment of FIG. 6 illustrating the addition of ramp surfaces beneath the wing for the production of a high pressure shock field therebelow;

FIG. 10 is a front elevational view partly in section, taken in the plane of line 10—10 in FIG. 8;

FIG. 11 is a partial bottom plan view of an embodiment of this invention showing a pod-type engine mounting with a conical inlet diffuser suspended beneath an airfoil surface;

FIG. 12 is a side elevational view of the engine pod and conical inlet diffuser of FIG. 11 illustrating the oblique shock pattern and its action on the airfoil surface;

Figure 1:
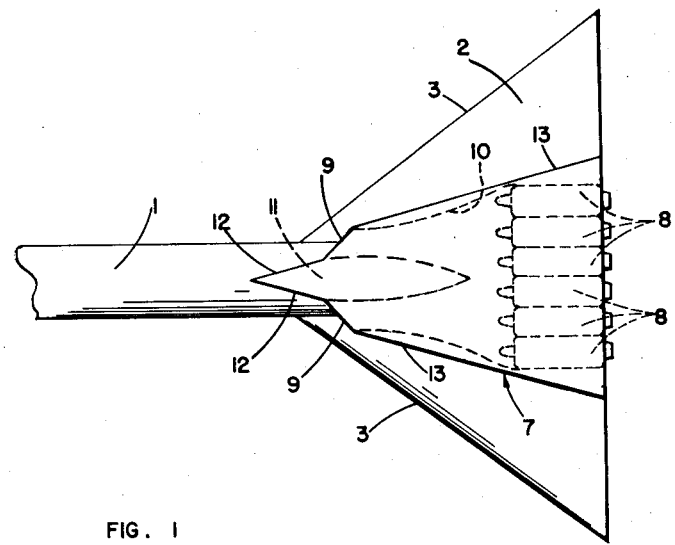
FIG. 1 is a fragmentary bottom plan view of an aircraft utilizing a basic embodiment of this invention showing an engine inlet structure and shock producing mechanism positioned beneath the aircraft wing.

FIG. 13 is a fragmentary plan view of a wing and fuselage combination illustrating various possible ramp locations relative to the airfoil leading edge, whereby the oblique shock wave may be formed ahead of, coincident with, or behind the airfoil leading edge; and FIG. 14 is a schematic bottom plan view of an embodiment illustrating the use of additional side inlets in conjunction with a primary divided center line inlet.

In general, a conventional supersonic fuselage is essentially symmetrical, enlarging from the nose rearwardly to a relatively constant cross section. The compression or pressure field existing behind the shock wave at the nose of such a body traveling at supersonic speed is uniform around the circumference, resulting in zero net lift at zero angle of attack, but resulting in a certain amount of pressure drag behind the shock wave.

By arranging a wing-fuselage combination in a manner such as to take advantage of the compression shock wave, by making it produce lift, then for a body with comparable drag, the lift-drag ratio may be increased. Ideally, this result may be secured with a body configuration that enlarges continuously in a rearward direction from the nose wherein the bottom half of the body is placed under the wing so that the wing leading edge substantially coincides in planform with the body shock wave pattern for a particular design Mach number. Thus, the undersurface of the body and also the undersurface of the wing would have a compression, or lift force acting on it. Preferably the trailing edge of the wing should be swept back and joined to the body at its base.

To utilize the principle outlined above, in a practical aircraft configuration, several compromises are necessary. For instance, the use of a forebody ahead of the wing for a pilot enclosure or for other auxiliary equipment, and the practical aspects of getting an efficient duct configuration of adequate size, result in a departure from the ideal semiconical configuration wherein the apex of the body or fuselage coincides with the wing leading edge.

Methods and means for producing static pressure fields, at supersonic speeds, that may be either higher or lower than the upstream pressure are well known in the art. For instance, the design of an engine air inlet for high supersonic speeds has as its goal the attainment of high static pressure and maximum pressure recovery in the inlet air by the creation of oblique and normal compression shock waves. Similarly, it is possible to reduce the static pressure of a supersonic fluid stream by creation of an oblique expansion wave.

Various shock generating devices are known in the art, such as wedges and ramps, which can be used for the production of either compression or expansion waves under two-dimensional flow conditions. Similarly, bodies of revolution, such as cones or semiconical bodies, are equally well known for producing and controlling shock fields under three-dimensional flow conditions. Additionally, such shock generating devices may be of a laterally adjustable type as described in Patent No. 2,969,939, or they may be axially translatable, as taught for a conical supersonic diffuser in Patent No. 2,638,738. Thus, it will be seen that the production of shock pressure systems, as such, is old and well known in the art and requires only a proper choice of design parameters to achieve the desired result. However, applicants' invention comprises a unique arrangement of engine air inlet geometry in conjunction with the primary lifting surface of an airborne vehicle in a manner to produce an upwardly directed pressure differential acting across such airfoil surface to produce an increase in the lifting force acting thereon.

Broadly, it will be understood that the term "airfoil surface" as used herein, comprises that portion of the fuselage or aircraft body upon which the shock pressure field acts as well as the wing surface.

Figure 2:
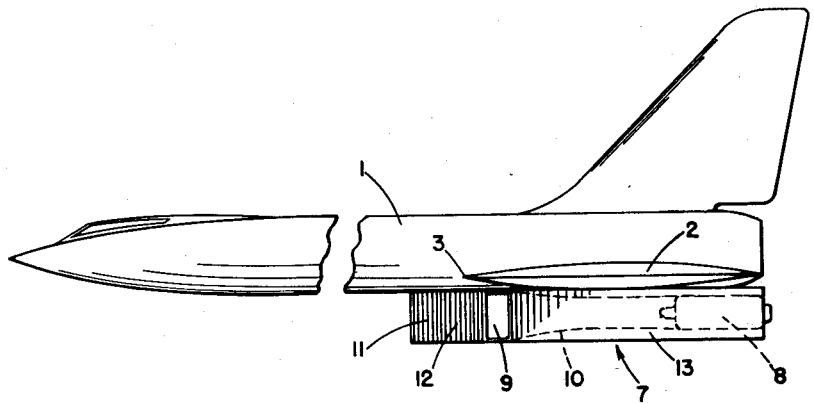
FIG. 2 is a partial side elevational view of the embodiment of FIG. 1.

The arrangement proposed herein offers extensive application for practical airframe configurations powered by air-breathing-engines. A basic embodiment of the invention is shown in FIGS. 1 and 2 wherein numeral 1 indicates the body or fuselage of an airborne vehicle. As shown, this body is substantially cylindrical over the whole of its after portion, but it could also include a tapered boat-tailed or otherwise streamlined rear end portion. Wing 2 is illustrated as being of a triangular or delta planform, but it is to be understood that the present invention is not limited to any particular fuselage or shape. However, a delta planform is particularly suitable for use in conjunction with the present invention since the shock generating device can be readily proportioned to produce oblique shock waves that will substantially coincide with the wing leading edge 3, or else the shock wave may be positioned ahead of or behind the wing leading edge, all as indicated in FIG. 13 by numerals 4, 5 and 6, respectively. The optimum position for the oblique shock wave relative to the leading edge is necessarily a design problem to be determined for each individual aircraft configuration. A nacelle structure 7 attached beneath fuselage 1, in FIGS. 1 and 2, and also beneath the wing 2, has air breathing reaction type engines 8 therein. Engine air inlet 9 is positioned in the forward part of the nacelle and connected to the engines by an internal duct 10. A wedge 11 which may have fixed or movable ramps 12 thereon is positioned within inlet 9 and projecting forwardly therefrom for the generation of an oblique shock wave on each side of the wedge for initiating pressure recovery in the engine inlet air. The same shock wave also extends beyond the edges of the inlet obliquely rearwardly, substantially in parallel or coincident relation in plan view with leading edge 3. The increase in static pressure existing behind the shock front acts on the under surface of the wing 2 to provide an additional lifting force thereon.

Figure 8:
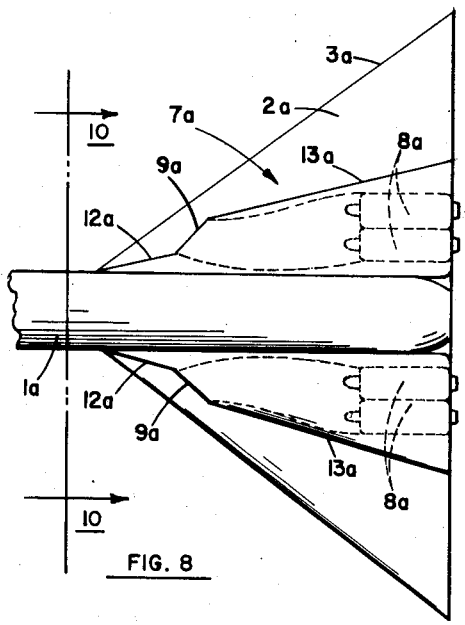
FIG. 8 is a bottom plan view of a modification of the embodiment of FIG. 1 wherein the engines are submerged in the fuselage and the engine air inlets and ramps are positioned on the side of the fuselage.
Figure 9:
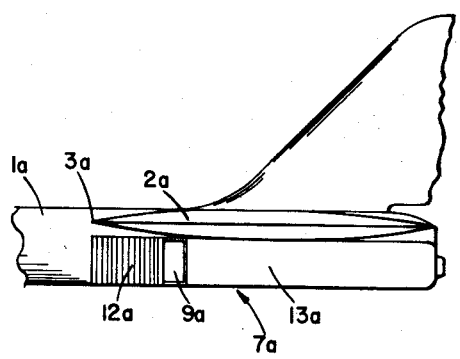
FIG. 9 is a side elevational view of the embodiment of FIG. 8.

The modification shown in FIGS. 8, 9 and 10 is an additional practical application of the inventive concept. Here the fuselage 1a has been enlarged in its aft portion to contain the air breathing engines 8a, while the air inlets 9a and ramps 12a are positioned on the sides of the fuselage. This configuration requires the use of a high wing in order to utilize the shock pressure field therebeneath to attain additional lift.

Thus, independent of the effect of the wedge or ramp on the air entering the engine air inlet itself, the effect of that same wedge or ramp, either when acting by itself or when used in conjunction with the ramps located on the sides of the engine nacelle or fuselage, is to cause the shock induced compression field to act only on the underside of the lifting surfaces. The lifting force so obtained, due to the strengthening of the pressure field beneath the wing, is essentially independent of attitude; hence, an airframe which requires a certain particular total lift force for flight obtains the required lift at a lower angle of attack. Since supersonic drag-due-to-lift is a function of the attitude, attainment of the required lift at a reduced lift at a reduced angle of attack results in reduced drag. The resultant lift-to-drag ratio is higher and performance is improved proportionately. Simultaneously, a practical inlet-duct arrangement is provided for an air-breathing-type engine installation.

Figure 3:
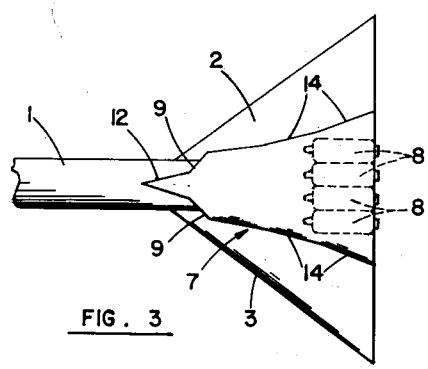
FIG. 3 is a fragmentary bottom plan view showing an inlet configuration similar to that of FIG. 1, but having compression ramps on the exterior surfaces of the engine nacelle for strengthening of the lift producing compression shock field.

The resulting shock field created by the engine duct air inlet wedge may be subsequently reinforced, maintained or lessened by proper shaping of the external sides 13, 13a of the engine air inlet duct, engine nacelle or fuselage to provide ramps or shock producing surfaces thereon. FIG. 3 illustrates external side ramps 14 on the engine nacelle for the creation of reinforcing compression shock waves of the so-called "corner type" at the junction of the ramp surfaces.

Varying the location and shape of the central, forwardmost wedge and/or the secondary or side ramps allows variation in the strength of the shock pressure field and thereby of the force applied to the lifting surface. As pointed out above, a wedge may have laterally adjustable ramps thereon. While the nose portion of an air inlet wedge will normally have a fixed included angle, variation of the adjustable side ramps which may be located on the air inlet wedge, and also further rearwardly along the sides of the fuselage or nacelle, will allow the strength of the oblique corner waves, which are created at the junction of the fixed wedge and the variable ramp, or between adjacent adjustable ramps, to be increased or decreased thereby strengthening or weakening the shock pressure field.

Figure 3A:
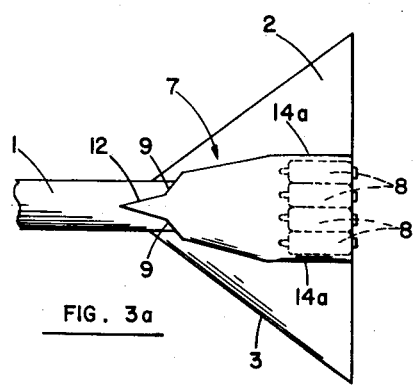
FIG. 3a is a fragmentary bottom plan view showing another engine nacelle configuration having its aft exterior portion shaped to produce an expansion wave with a consequent reduction of the compression shock field pressure under the rearward portion of the airfoil.
Figure 3B:
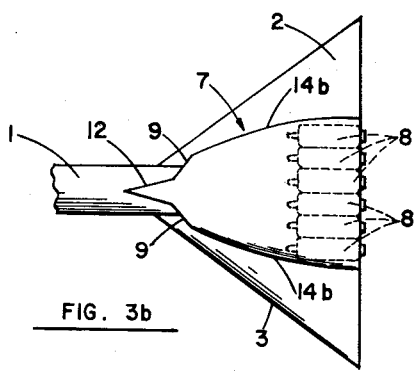
FIG. 3b is a fragmentary bottom plan view showing an embodiment of a nacelle configuration similar to that of 3a, but having a smoothly curved exterior surface on the inlet duct whereby a compression shock wave may be formed at the forward portion of the inlet and expansion waves at the rearward portion thereof.

In some instances it may be desired to reduce the strength of the shock induced pressure field, as, for instance, for aircraft trimming purposes. This may be accomplished by creating expansion waves by turning the exterior side walls of the duct, along which the air is flowing, in a direction away from the air stream. This is illustrated in FIGS. 3a and 3b. FIG. 3a teaches the use of side ramps 14a positioned for creating an expansion wave, while FIG. 3b illustrates the use of a continuously curved inlet exterior side surface, the forward portion of which may, if desired, be designed to create compressive oblique shock waves, while the aft portion 14b creates expansive waves to reduce the pressure field as desired.

The inventive concept outlined and illustrated herein is equally applicable to air inlets and supersonic diffusers having three-dimensional flow characteristics. FIGS. 4 and 5 illustrate this application with an engine nacelle 7b positioned below a delta-type airfoil 2b and having a semicircular engine air inlet 15 with a semiconical diffuser 16 extending forwardly therefrom. FIGS. 11 and 12 show a suspended type of engine pod installation 20, wherein a conical diffuser element 21 is used for generating a primary shock wave 22. The compression shock field existing behind this shock wave may be advantageously reinforced by the creation of a second oblique shock wave 23 at the leading edge of the pylon support 24. The sides of this pylon may also be formed with ramps to produce one or more compressive waves to further reinforce the pressure field or to produce one or more expansive waves to lessen the pressure field. Dashed line 31, in FIG. 11, indicates the leading edge of an alternate wing shape that can be used equally well with this invention. Engine pod 20 is also shown with a rearwardly tapering frusto-conical aft portion for producing a three-dimensional expansion wave 32 for trimming purposes.

FIGS. 6 and 7 illustrate yet another possible configuration for obtaining a greater lift-pressure-differential across the airfoil. Air inlet duct 25 is located to have its air inlet 26 on the upper surface of the aircraft or missile. As the duct fairs downwardly and rearwardly to the engines submerged in the aft portion of fuselage, the exterior surfaces 30 of the duct walls are formed with a rearwardly diminishing configuration to create expansion waves, thereby reducing the strength of the pressure field above the airfoil and increasing the vertical pressure differential across the airfoil. To further increase the pressure differential and thereby add to the lift, compressive shock generating means may be located to produce a relatively high pressure field acting on the underside of the wing 2d. In this embodiment, this is accomplished by the outwardly flaring fuselage sides 27 which can be made to effectively form compression ramps acting to produce a lift inducing pressure field below the wing.

FIG. 14 is illustrative of another embodiment wherein auxiliary engine air inlets 28, each of which has its own ramp system 29, are positioned on each side of the primary center line inlet 9e and contribute to the strengthening of the shock pressure field.

From the description of the foregoing embodiments, it will be seen that the shape of the shock producing device and its manner of operation are not of paramount importance in this invention, provided the wedge, cone or semiconical shock generating device produces a compression shock pressure field or expansion field having a configuration, strength and location such that it will provide the optimum lifting force vertically across the airfoil, while at the same time providing optimum pressure recovery in the air being supplied to the engine.

By way of summary, in this invention the fuselage after body for a practical aircraft configuration is located under, or partially under the wing, and from a bottom view includes a wedge originating substantially at the wing leading edge. The shock generated by this wedge generally conforms to the wing leading edge configuration for a particular preselected design Mach number, such as high speed cruise. The under surface of the wing then is subjected to a compression force behind the shock wave. In effect, the wing then has positive lift at zero angle of attack. The body volume and base area of the design of FIGS. 1 and 2 are of a minimum size to accommodate the required power plants, fuel and equipment, thus, no particular drag penalty is incurred. With the lift obtained at zero angle of attack, the lift required for cruise flight is obtained at a lower aircraft angle of attack. Since the drag due to lift is proportional to the angle of attack, the result is thus a lower drag-due-to-lift and consequently a higher lift-to-drag ratio.

While particular embodiments of this invention have been illustrated and described herein, it will be apparent that various changes and modifications may be made in the construction and arrangements of the various parts without departing from the spirit and scope of this invention and its broader aspects, or as defined in the following claims.

We claim:

1. In an aircraft powered by an air-breathing engine and capable of supersonic flight, the combination of an airfoil having a swept back leading edge, an engine air inlet duct beneath said airfoil surface, an adjustable vertical wedge means positioned in said inlet duct and extending forwardly therefrom for achieving optimum pressure recovery of the engine inlet air and attaining optimum engine thrust, said wedge means further having an included angle and being located relative to said leading edge such that the oblique shock wave generated by said wedge means at a predetermined Mach number substantially coincides in planform with the airfoil swept back leading edge whereby the shock pressure field generated by said wedge acts on the undersurface of said airfoil to provide greater lift and increase the lift-to-drag ratio of the aircraft.

2. In an aircraft powered by an air-breathing engine and capable of supersonic flight, the combination of an airfoil having a swept back leading edge, an engine air inlet duct beneath said airfoil, a laterally adjustable vertical wedge means positioned in said inlet duct and extending forwardly therefrom for achieving optimum pressure recovery of the engine inlet air and attaining optimum engine performance, said wedge means further having an included angle and being located relative to said leading edge such that the oblique shock wave generated by said wedge at a predetermined Mach number substantially coincides in planform with the airfoil swept back leading edge whereby the shock pressure field generated by said wedge acts on the undersurafce of said airfoil to provide increased lift and a larger lift-to-drag ratio of the aircraft, and symmetrical ramp means on the outer surface of said inlet duct for generating oblique shock waves to reinforce the wedge generated shock pressure field and thereby further increase the aircraft lift-to-drag ratio.

3. In a supersonic vehicle powered by air-breathing engines, the combination with an airfoil having a swept back leading edge, of a plurality of engine air inlet ducts beneath said airfoil, at least one vertical ramp positioned in each of said inlet ducts for attaining optimum pressure recovery in the engine inlet air, each of said ramps being positioned relative to the leading edge and relative to each other to produce a reinforced shock pressure field below the airfoil and having a shock wave leading edge configuration substantially conforming to the swept back leading edge configuration of said airfoil at a predetermined design Mach number to provide greater lift and increase the lift-to-drag ratio.

References Cited in the file of this patent
UNITED STATES PATENTS

| | | |
|---|---|---|
| 2,512,794 | Goddard | June 27, 1950 |
| 2,557,522 | Vautier | June 19, 1951 |
| 2,649,266 | Darrieus | Aug. 18, 1953 |
| 2,688,841 | Decher et al. | Sept. 14, 1954 |
| 2,727,706 | Heilig | Dec. 20, 1955 |
| 2,759,686 | Griffith | Aug. 21, 1956 |
| 2,772,620 | Ferri | Dec. 4, 1956 |
| 2,776,806 | Brendal | Jan. 8, 1957 |
| 2,805,032 | Davis | Sept. 3, 1957 |
| 2,829,490 | Kresse | Apr. 8, 1958 |
| 2,916,230 | Nial | Dec. 8, 1959 |
| 2,941,751 | Gagarin | June 21, 1960 |
| 2,997,256 | Walker | Aug. 22, 1961 |